United States Patent

Chirco

[15] 3,693,399
[45] Sept. 26, 1972

[54] FASTENER INSTALLATION AND CRIMPING TOOL

[72] Inventor: Peter R. Chirco, Utica, Mich.

[73] Assignee: Huck Manufacturing Company

[22] Filed: Nov. 2, 1970

[21] Appl. No.: 76,841

Related U.S. Application Data

[63] Continuation of Ser. No. 708,713, Feb. 27, 1968, abandoned.

[52] U.S. Cl. .................72/391, 72/402, 72/452
[51] Int. Cl. ...............................................B21d 9/05
[58] Field of Search ....72/391, 452, 402, 397; 81/10, 81/55, 56; 151/21 B, 21 C, 2 R; 29/517, 437, 243.5

[56] References Cited

UNITED STATES PATENTS

| | | |
|---|---|---|
| 3,478,564 | 11/1969 | Hurd ...........................72/391 |
| 2,311,662 | 2/1943 | Hunziker.....................72/402 |
| 2,382,359 | 8/1945 | Weightman .................29/517 |
| 3,154,978 | 11/1964 | Baker..........................72/402 |
| 3,122,948 | 3/1964 | Baugh..........................72/391 |
| 3,417,598 | 12/1968 | Valente .......................72/402 |

Primary Examiner—Richard J. Herbst
Assistant Examiner—Gene P. Crosby
Attorney—Harness, Dickey & Pierce

[57] ABSTRACT

An installation tool for applying fasteners which comprise a bolt and a collar or nut in which a radially directed crimping force is applied to the nut substantially therearound, after the nut is first threaded on the bolt, to effect an elongation of the nut and into which the crimping force is applied by a plurality of separate crimping jaws constructed so that a relatively short tool with an offset or eccentric crimping nose is provided for clearance applications and reduction in weight.

13 Claims, 5 Drawing Figures

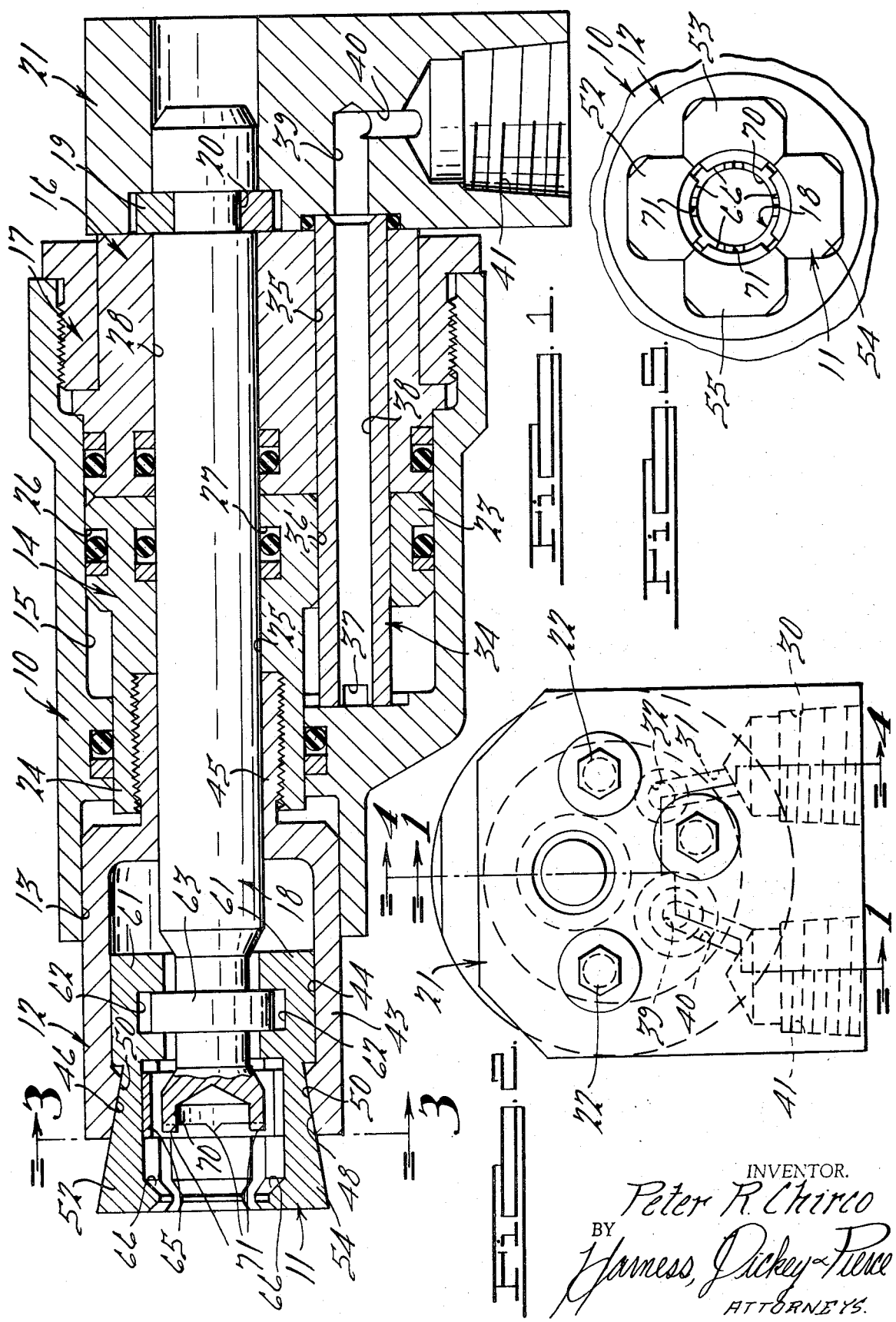

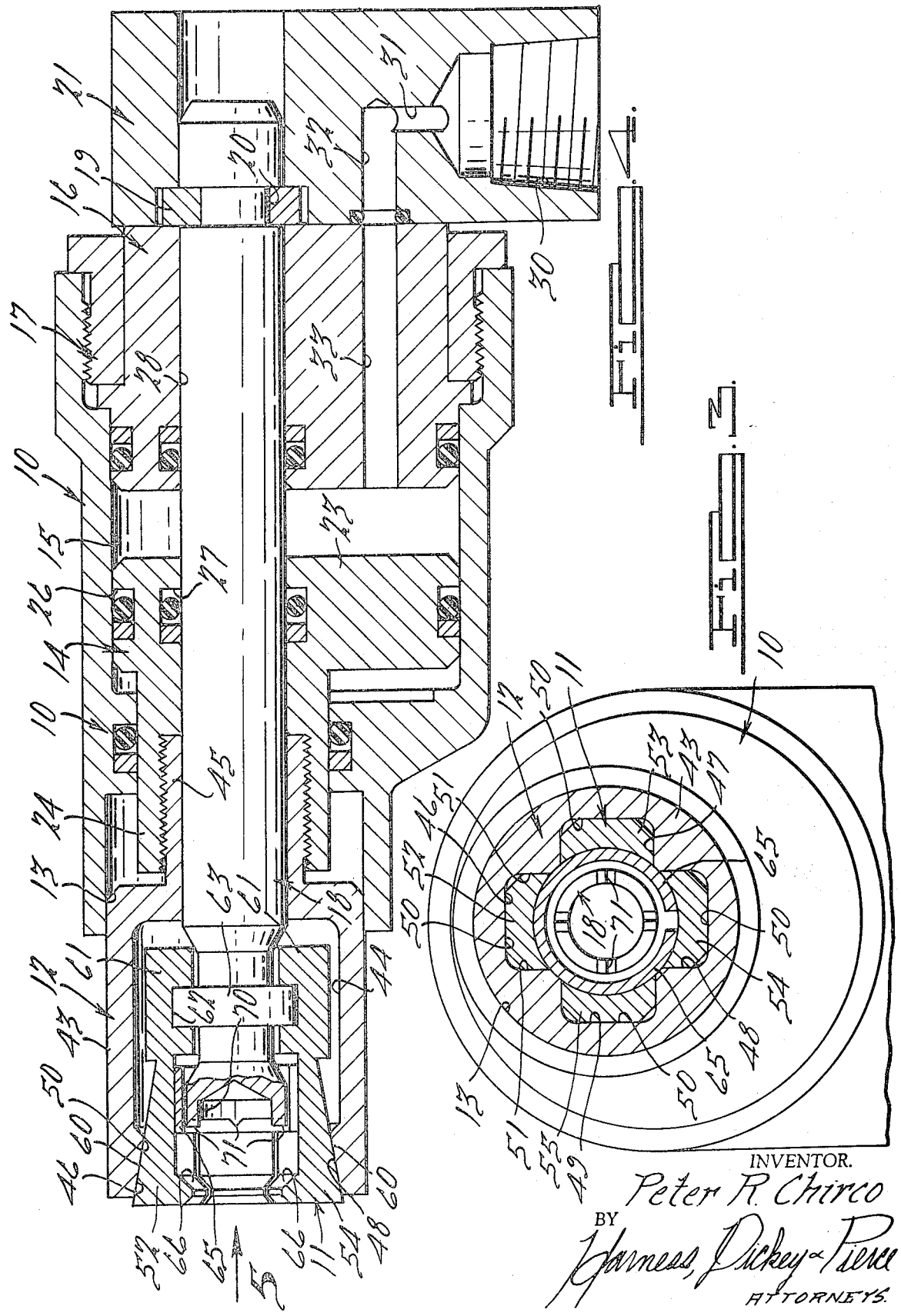

FASTENER INSTALLATION AND CRIMPING TOOL

This is a continuation of U.S. application Ser. No. 708,713, filed Feb. 27, 1968, now abandoned.

The present invention relates to improvements in crimping tools particularly of the type which are used for the installation of special fasteners.

This type of special fastener comprises a bolt and special form of nut or collar in which the nut is first threaded onto the bolt and thereafter crimped. The effect of the crimping is to cause a portion of the counterbore of the collar to be forced in additional locking grooves in the pin and to effect an elongation of the collar or nut so that the bolt is placed under a high residual tension or high clamping force. Such fasteners are used in structures where tool clearance or weight of the tool are both big factors.

Crimping tools for the purpose of applying a radial crimping force to special fasteners are known. An illustration of such prior art crimping tools is disclosed in Baugh et al. U.S. Pat. No. 3,029,665, granted Apr. 17, 1962. In structural work, fasteners are located and applied according to specified patterns so that the structural strengths are accomplished by placing the proper number of fasteners with the center lines spaced from each other at predetermined distances. Such fasteners are also often located in relatively inaccessible places.

Accordingly, it is one of the primary objects of the present invention to provide a fastener of such construction that it may be strong enough to apply the required crimping force but yet be small enough, both in nose diameter and length, that it can reach the fasteners for crimping on their predetermined spacing and in the inaccessible places.

Also, since tools of this type are handled on the job by workers who hold them in their hands, it is another object of this invention that such tools be of as small size as possible so that the tools may be of as little weight as possible.

Other objects, of the invention will become apparent from the specifications, the drawings relating thereto and from the claims hereinafter set forth.

In the drawings in which like numerals are used to designate like parts in the several views throughout;

FIG. 1 is a longitudinal cross-sectional view, with parts in elevation, of one form of crimping tool constructed according to the present invention and taken substantially along the line 1—1 of FIG. 2, and showing the crimping jaws in open position prior to crimping;

FIG. 2 is an end elevational view of the structure shown in FIG. 1 taken from the right hand end thereof toward the tool;

FIG. 3 is a cross-section end elevational view taken substantially along the line 3—3 of FIG. 1;

FIG. 4 is a view generally similar to FIG. 1, taken along the line 4—4 of FIG. 2, and showing the crimping jaws and tool parts in closed crimping position; and FIG. 5 is a fragmentary end view of the tool of FIG. 4 taken in the direction of the arrow 5.

Referring to the drawings, the crimping tool comprises a cylindrical housing or barrel generally indicated at 10. Crimping jaws generally indicated at 11 are mounted within a finger holder generally indicated at 12 which in turn is mounted within the open end 13 of the barrel housing 10 for sliding or relative longitudinal movement with respect thereto.

A piston generally indicated at 14 is mounted within the bore 15 of the housing 10 for reciprocation therein.

An end cap generally indicated at 16 closes the opposite end of the housing 10 and is held in place by a locking ring generally indicated at 17 which is threadably received within the threaded end of the housing 10.

A jaw actuator and tool locator generally in the form of an elongated solid bar is indicated at 18. The bar 18 is fixed in place within the housing by means of a split retainer ring 19 which engages within an annular groove 20 adjacent one end of the bar 18 and abuts against the adjacent face of the end cap 16.

Suitable porting for causing reciprocation of the piston 14 is provided, and which will be described in detail hereafter; and an end adapter generally indicated at 21 is secured to the outer end of the end cap 16 by means of bolts 22 which pass through openings in the adapter 21 and are threaded into the adjacent face of the end cap 16. The adapter 21 also has suitable porting for communication with the inlet and return ports in the tool and for communication to a suitable source of fluid or hydraulic pressure for the inlet side and from the exhaust or return side to an exhaust location.

The piston 14 comprises a circular body portion 23 which is slidably disposed within the bore 15 for reciprocation therein and which has an integral rod portion 24 projecting from one side. The piston has a longitudinal opening 25 through which the rod 18 extends. The center line of the opening 25 is offset or eccentric to the body portion 23 of the piston which allows the tool to reach into spaces which would be inaccessible in the instances where such center lines are the same. This will be evident from the complete description of the tool and its operation.

The piston 14 is sealed with respect to the housing 10 with respect to the rod 18 by sealing means located in annular grooves 26 and 27 respectively. Conventional sealing means such as O-ring seals and back-up rings are disposed within such sealing grooves.

The end cap 16 also has a longitudinal opening 28 therethrough which is aligned with the opening 25 of the piston and which is sealed with respect to the housing 10 and the rod 18 by a conventional sealing arrangement indicated which is of the same type as just described with respect to the piston.

In its reciprocation, the piston 14 slides on the rod 18 but the rod 18 is fixed relative to the end cap 16 and to the housing by the split ring retainer 19 above described.

The piston 14 is caused to reciprocate within the housing by means of fluid pressure, in the particular instance being described hydraulic pressure, through the adapter 21 and through suitable portings provided within the adapter 21 and end cap 16 of the piston 14.

The adapter 21 has an inlet port 30 adapted to be connected to a suitable source of hydraulic pressure through a conventional hose connection. The inlet port 30 communicates through channels 31 and 32 formed in the adapter plate 21 and through longitudinal channel 33, formed in the end cap 16, as shown in FIG. 4. The channel 33 communicates with the bore of the housing 10 as indicated in FIG. 4 so that when fluid pressure is provided through opening 30 such fluid under pressure enters the bore of housing 10 on the back side of the piston causing it to move from the position shown in FIG. 1 to the position shown in FIG. 4. Fluid on the opposite side of the piston 23 then returns through a tube generally indicated at 34. Such return tube 34 is mounted within aligned openings 35 and 36 provided in the end cap 16 and the piston 23 (FIG. 1). The return tube is provided with equally spaced inlet ports 37 formed in the inner end of the tube 34 and communicating with the piston chamber within the housing 10 on the forward side thereof so that the fluid exhausts through such ports 37 and through the longitudinal opening 38 in the tube, communicating with channels 39 and 40 formed in the adapter 21 which in turn communicate with exhaust port 41. Such exhaust port 41 is connected by a suitable hose connection with a return chamber of the pressure source (not shown).

The means just described to affect the reciprocation of the piston 14 are well known per se in the art and form no part of the present invention per se but are described in order to illustrate one approved and satisfactory means for effecting the reciprocation of the piston.

The eccentric mounting of the rod 18, which in turn locates the corresponding means 11 eccentrically with respect to the piston 14, is regarded as a part of the present invention in that it serves to permit readily accessibility to places which otherwise may not have been accessible.

The present invention is primarily concerned with the construction and formation of the crimping jaws generally indicated at 11 and the holder generally indicated at 12.

The holder 12 comprises a cylindrical portion 43 having a center bore 44 and terminating at its inner end in a rearwardly extending concentric projection 45 having an opening therein which slidably receives the rod 18. The outersurface of the inner end of the portion 45 is threaded and is received within the threaded end of the rod portion 24 of the piston 14 so that the holder 12 is caused to reciprocate upon reciprocation of the piston 14.

The forward end of the holder 12 is formed with a plurality of recesses 46, 47, 48 and 49, equally spaced therearound, there being four in the embodiment here illustrated. Such recesses are each formed with tapered surfaces 50 as shown in FIG. 1 which are transversely flat as shown in FIG. 3. Each of the recesses is also provided with parallel side walls 51 which embrace the fingers of the crimping jaws and slidably engage the sides of the such crimping walls during relative longitudinal movement of the jaws 11 and the holder 12. Such relative longitudinal movement effects the crimping by causing the jaws to move from the open position shown in FIG. 1 to the close position shown in FIG. 4.

The crimping jaws 11 comprise a plurality of separate fingers 52, 53, 54 and 55 each one being mounted within recesses 46, 47, 48 and 49 respectively, of the holder 12.

The outer surface of each of the fingers 52, 53, 54 and 55 is formed with a longitudinal taper 60 which bears against and cooperates with the adjacent tapers 50 of the recesses within which the finger is located, so that upon movement of the piston from the position shown in FIG. 1 to that shown in FIG. 4, the crimping fingers are caused to move inwardly from open to closed position. The crimping fingers are also formed with transverse flats and have side walls similar to the transverse flats 50 and side walls 51 of the holder recesses.

The inner ends of the fingers comprise a body portion 61 having their outer surfaces in the form of cylindrical segments which can bear against or be in clearance relationship with the adjacent cylindrical opening 44 in the holder 12 during relative reciprocation between the holder 12 and the crimping fingers 11. Each of the fingers is also provided with a semi-annular recess 62 which is adapted to slidably embrace an annular integral projection 63 formed on the rod 18. The jaws 52 through 55 are thus held against longitudinal movement with respect to the holder 12 but may move radially in and out due to the cooperation between the annular projection 62 and the recesses 62 between the position shown in FIG. 4 and FIG. 1, or in other words, to move between open and crimping position.

The jaws 52 to 55 are held in their open position by means of the resilient split spring 65, which bears against the inner faces of the fingers 52 to 55. Such inner faces are concentrically curved as shown in FIG. 3.

Each of the outer ends of the jaws 11 is formed with an inwardly directed crimping projection 66 which are curved to embrace the nut being applied and are of such configuration and depth as to affect the proper crimping of the nut. The particular configurations and dimensions of such projections for optimum results do not form per se a part of the present invention and are known in this art.

It is desired that the fingers be so constructed that when they reach their fully closed position the adjacent sides thereof abut thus limiting the inward movement of the fingers and assuring that the nut has been fully and properly crimped. In other words, the amount of crimping is predetermined by known calculations to give the desired result in the fastener and by limiting the inward movement, it would therefore be known that upon reciprocation of the piston, the fasteners are properly crimped. They cannot be over crimped by the use of the present invention.

It is also desirable that the nut of the fastener be properly located on the pin to which it is going to be crimped so that the crimping will take place in the proper location. Such locating means per se does not form a part of the present invention, but one such means is illustrated which includes an open end 70 formed on the rod 18 which is adapted to abut against the end of the nut when the tool is applied. The locating end 70 is also formed with annularly spaced projections 71 thereon. During the crimping operation, the collar elongates and such projections 71 accommodate such elongation of the collar during the crimping by being impressed into the end of the nut or collar.

Thus, in the operation of the present invention, the piston 14 is caused to reciprocate as described above. During such reciprocation of the housing or holder 12 is also caused to reciprocate with the piston because of its inner fixed connection with the rod end 24 of the piston. The fingers 11 are held stationary with respect to the housing 10 by the rod 18. Thus, the housing 12 is caused to move from the position shown in FIG. 1 to that shown in FIG. 4 effecting a radially inwardly movement of the crimping fingers from the position shown in FIG. 1 to that shown in FIG. 4.

The provision of the cooperating transverse flats 50 and 60 of the fingers and recesses of the holder make it possible to reduce the outside dimensions of the housing 12 while retaining the strength required to force the crimping fingers inwardly. The use of the separate fingers 52 through 55 makes it possible to considerably shorten the entire tool over prior known tools. The eccentric location of the holder 12 and the jaws 11 also make it possible to insert the tool in places that would not otherwise have been accessible.

Formal changes and variations may be made in the various embodiments of the invention described without departing from the spirit and scope of the invention as set forth in the appended claims.

What is claimed is:

1. A fastener installation tool for installing a fastener which comprises a pin having a head and shank and locking groves formed in the shank at a position spaced from said head, and a nut disposed on said shank in embracing relationship with respect to said grooves, said tool comprising a tubular barrel member provided with an open end, a plurality of longitudinally extending individual crimping jaws separately disposed within said barrel member in engagement therewith, each of said jaws having a body portion and a jaw portion located at one end of said body portion with said jaw portion operable to engage the nut, means mounting each of said jaws within said barrel for radial and longitudinal movement of said jaws with respect to said barrel whereby said jaw portion and the opposite terminating end of said body portion can move radially, said mounting means mounting each of said jaws within said barrel with each of said jaw portion normally located outwardly beyond said barrel, the outer ends of said jaws and barrel member having cooperating tapered surfaces to effect said radial movement upon said relative longitudinal movement, and means to effect said relative longitudinal movement whereby each of said jaw portion is moved into crimping engagement with the nut.

2. A fastener installation tool according to claim 1 in which resilient means, separate from said jaw members, are provided in engagement with all of said separate crimping jaws to urge said jaw portions to open position.

3. A fastener installation tool for installing a fastener which comprises a pin having a head and shank and locking grooves formed in the shank at a position spaced from said head, and a nut disposed on said shank in embracing relationship with respect to said grooves, said tool comprising a tubular barrel member provided with an open end, a plurality of longitudinally extending individual crimping jaws separately disposed within said barrel member in engagement therewith, means mounting each of said jaws within said barrel for radial and longitudinal movement with respect to said barrel, the outer ends of said jaws and barrel member having cooperating tapered surfaces to effect said radial movement upon said relative longitudinal movement, and means to effect said relative longitudinal movement, housing means for supporting said barrel member and said jaws, and holding means for holding said separate crimping jaws against longitudinal movement relative to said housing means, and means to cause longitudinal movement of said barrel member relative to said housing means to cause radial movement of said jaws.

4. A fastener installation tool according to claim 1 including stop means on said jaws for limiting said radial movement of said jaws to a preselected radially innermost position whereby a predetermined degree of crimping of the nut will occur.

5. A fastener installation tool for installing a fastener which comprises a pin having a head and shank and locking grooves formed in the shank at a position spaced from said head, and a nut disposed on said shank in embracing relationship with respect to said grooves, said tool comprising a tubular barrel member provided with an open end, a plurality of longitudinally extending crimping jaws disposed within said barrel member in engagement therewith, each of said jaws having a body portion and a jaw portion located at one end of said body portion with said jaw portion operable to engage the nut, means mounting each of said jaws within said barrel for radial and longitudinal movement of said jaws with respect to said barrel whereby said jaw portion and the opposite, terminating end of said body portion can move radially, said mounting means mounting each of said jaws within said barrel with each of said jaw portion normally located outwardly beyond said barrel, the outer ends of said jaws and barrel member having cooperating tapered surfaces to effect said radial movement upon said relative longitudinal movement, and means to effect said relative longitudinal movement, whereby each of said jaw portion is moved into crimping engagement with the nut, stop means on said jaws for limiting said radial movement of said jaws to a preselected radially innermost position whereby a predetermined degree of crimping of the nut will occur, said stop means including confronting surfaces on adjacent ones of said jaws which engage each other at said innermost position.

6. A fastener installation tool for installing a fastener which comprises a pin having a head and shank and locking grooves formed in the shank at a position spaced from said head, and a nut disposed on said shank in embracing relationship with respect to said grooves, said tool comprising a tubular barrel member provided with an open end, a plurality of longitudinally extending crimping jaws disposed within said barrel member in engagement therewith, means mounting said jaws within said barrel for radial and longitudinal movement with respect to said barrel, the outer ends of said jaws and barrel member having cooperating tapered surfaces to effect said radial movement upon said relative longitudinal movement, and means to effect said relative longitudinal movement, stop means on said jaws for limiting said radial movement of said jaws to a preselected radially innermost position whereby a predetermined degree of crimping of the nut will occur, said stop means including confronting surfaces on adjacent ones of said jaws which engage each other at said innermost position, housing means for supporting said barrel member and said jaws, and holding means for holding said separate crimping jaws against longitudinal movement relative to said housing means, and means to cause longitudinal movement of said barrel member relative to said housing means to cause radial movement of said jaws.

7. The tool of claim 6 further comprising a piston mounted in said housing means for reciprocation, means connecting said piston to said barrel member, and with said holding means comprising a longitudinally extending bar connected at one end of said jaws and extending through said piston and being held to said housing means.

8. A fastener installation tool for installing a fastener which comprises a pin having a head and shank and locking grooves formed in the shank at a position spaced from said head, and a nut disposed on said shank in embracing relationship with respect to said grooves, said tool comprising a tubular barrel member provided with an open end, a rod member located within said barrel member for reciprocal movement relative thereto, a plurality of longitudinally extending individual crimping jaws separately disposed within said barrel member in engagement therewith, each of said jaws having a jaw portion operable to engage the nut, means mounting each of said jaws within said barrel for radial and longitudinal movement of said jaws with respect to said barrel and with each of said jaw portion normally located outwardly beyond said barrel, said mounting means including a groove on said rod member or said jaws and a shoulder located in said groove on the other of said rod member or said jaws, the outer ends of said jaws and barrel member having cooperating tapered surfaces to effect said radial movement upon said relative longitudinal movement, and means to effect said relative longitudinal movement whereby each of said jaw portion is moved into crimping engagement with the nut.

9. The fastener installation tool of claim 8 in which resilient means are provided in engagement with all of said jaws to urge each said jaw portion to open position.

10. A fastener installation tool for installing a fastener which comprises a pin having a head and shank and locking grooves formed in the shank at a position spaced from said head, and a nut disposed on said shank in embracing relationship with respect to said grooves, said tool comprising a tubular barrel member provided with an open end, a rod member located within said barrel member for reciprocal movement relative thereto, a plurality of longitudinally extending separate crimping jaws disposed within said barrel member in engagement therewith, each of said jaws having a jaw portion including a radially inward directed projection for engagement with the nut, said projection being substantially arcuate circumferentially, means mounting said jaws within said barrel for radial movement and for relative longitudinal movement with respect to said barrel and with each said jaw portion normally located outwardly beyond said barrel, said mounting means including a groove on said rod member or said jaws and a shoulder located in said groove in the other of said rod member or said jaws, the outer ends of said jaws and barrel member having cooperating tapered surfaces to effect said radial movement upon said relative longitudinal movement and means to effect said relative longitudinal movement, whereby the arcuate projections are moved to embrace and apply crimping forces to said nut as said jaws are moved radially inward.

11. A fastener installation tool for installing a fastener which comprises a pin having a head and shank and locking grooves formed in the shank at a position spaced from said head, and a nut disposed on said shank in embracing relationship with respect to said grooves, said tool comprising a tubular barrel member provided with an open end, a plurality of longitudinally extending separate, non-connected crimping jaws individually disposed within said barrel member in engagement therewith, each of said jaws being individually mounted, each of said jaws having a jaw portion including a radially inward directed projection for engagement with the nut, said projection being substantially arcuate circumferentially, means mounting said jaws within said barrel for radial movement and for relative longitudinal movement with respect to said barrel, the outer ends of said jaws and barrel member having cooperating tapered surfaces to effect said radial movement upon said relative longitudinal movement and means to effect said relative longitudinal movement, whereby the arcuate projections are moved to embrace and apply crimping forces to said nut as said jaws are moved radially inward.

12. The invention of claim 11 wherein, said crimping jaw elements are four in number.

13. A crimping tool for fastening a collar or a nut to a pin with locking grooves, comprising a barrel member with crimping means provided with tapered outer surfaces and being mounted within said barrel for longitudinal movement relative to said barrel member and cooperating with inner tapered surfaces of said barrel member, said crimping means being provided with inwardly extending projections on the forward end of the crimping means adapted to deform the collar or nut, characterized by the fact that the crimping means comprise separate crimping jaws having parallel side walls slidable in axial and radial direction, a central member located generally along the tool axis and extending at least partially concentrically and radially inwardly of said jaws, and means on one of said central member and said barrel member for cooperating with said side walls for circumferentially restraining said jaws, said jaws being each individually radially movably mounted on said central member within the tool, the jaws and the central member having respective interengaging surfaces perpendicular to the tool axis, permitting radial movement but no relative longitudinal movement.

* * * * *